United States Patent
Axmon

(10) Patent No.: US 9,907,084 B2
(45) Date of Patent: Feb. 27, 2018

(54) SCHEDULING IN HIGH SPEED SCENARIO

(71) Applicant: Telefonaktiebolaget L M Ericsson (publ), Stockholm (SE)

(72) Inventor: Joakim Axmon, Kävlinge (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 208 days.

(21) Appl. No.: 14/892,098

(22) PCT Filed: Oct. 27, 2015

(86) PCT No.: PCT/EP2015/074844
§ 371 (c)(1),
(2) Date: Nov. 18, 2015

(87) PCT Pub. No.: WO2017/032430
PCT Pub. Date: Mar. 2, 2017

(65) Prior Publication Data
US 2017/0257877 A1    Sep. 7, 2017

Related U.S. Application Data

(60) Provisional application No. 62/208,979, filed on Aug. 24, 2015.

(51) Int. Cl.
*H04W 72/12* (2009.01)
*H04W 64/00* (2009.01)
*H04W 4/02* (2018.01)
*H04B 7/024* (2017.01)

(52) U.S. Cl.
CPC ........ *H04W 72/1205* (2013.01); *H04B 7/024* (2013.01); *H04W 4/027* (2013.01); *H04W 64/003* (2013.01)

(58) Field of Classification Search
CPC .................................................. H04W 72/1205
See application file for complete search history.

(56) References Cited

U.S. PATENT DOCUMENTS

| | | | |
|---|---|---|---|
| 5,548,812 A * | 8/1996 | Padovani | H04W 52/04 370/332 |
| 5,715,526 A * | 2/1998 | Weaver, Jr. | H04W 52/343 455/103 |
| 6,701,164 B1 | 3/2004 | Yamaguchi et al. | |

(Continued)

OTHER PUBLICATIONS

Unknown, Author, "Evaluation of Unidirectional RRH Arrangement for HST SFN", 3GPP TSG RAN WG4 Meeting #76, R4-154520, Ericsson, Beijing, China, Aug. 24-28, 2015, pp. 1-3.

(Continued)

*Primary Examiner* — Andrew Lai
*Assistant Examiner* — Andrew C Lee
(74) *Attorney, Agent, or Firm* — Murphy, Bilak & Homiller, PLLC

(57) ABSTRACT

A method in a network node comprises determining (404) whether a wireless communication device is not high-speed capable. If so, a determination (406) is made of the position of the wireless communication device with respect to adjacent antenna nodes. Scheduling (408) of non-critical communication is then controlled in such way that it only is carried out within a certain range from each respective antenna node.

25 Claims, 7 Drawing Sheets

(56) References Cited

U.S. PATENT DOCUMENTS

| | | | |
|---|---|---|---|
| 2001/0004604 A1* | 6/2001 | Toshimitsu | H01Q 1/246 455/562.1 |
| 2001/0030948 A1* | 10/2001 | Tiedemann, Jr. | H04W 52/40 370/305 |
| 2005/0272431 A1* | 12/2005 | Katori | H04W 16/00 455/446 |
| 2006/0121901 A1* | 6/2006 | Tanaka | H04W 36/22 455/436 |
| 2009/0190555 A1* | 7/2009 | Oguchi | H04W 8/005 370/331 |
| 2010/0003990 A1* | 1/2010 | Suemitsu | H04W 72/02 455/442 |
| 2011/0143808 A1* | 6/2011 | Krco | H04W 8/08 455/525 |
| 2011/0199975 A1* | 8/2011 | Wu | H04L 1/1812 370/328 |
| 2011/0263198 A1* | 10/2011 | Wu | H04B 7/15542 455/7 |
| 2013/0035083 A1 | 2/2013 | Kadel | |
| 2013/0079005 A1* | 3/2013 | Watanabe | H04W 36/0083 455/435.1 |
| 2013/0203447 A1* | 8/2013 | Hannan | G01S 5/0205 455/456.5 |
| 2013/0260760 A1* | 10/2013 | Pan | H04W 36/32 455/436 |
| 2014/0051426 A1* | 2/2014 | Siomina | H04W 36/0088 455/422.1 |
| 2014/0087740 A1* | 3/2014 | Nakamura | H04W 36/14 455/444 |
| 2014/0099962 A1* | 4/2014 | Capdevielle | H04W 16/32 455/441 |
| 2014/0206414 A1* | 7/2014 | Oh | H04B 7/0404 455/562.1 |
| 2014/0225775 A1* | 8/2014 | Clevorn | H01Q 3/34 342/372 |
| 2014/0233457 A1* | 8/2014 | Koutsimanis | H04J 11/005 370/328 |
| 2015/0004975 A1* | 1/2015 | Yamamoto | H04W 36/30 455/436 |
| 2015/0131618 A1* | 5/2015 | Chen | H04W 16/02 370/332 |
| 2015/0141021 A1* | 5/2015 | Kapoulas | H04W 36/32 455/441 |

OTHER PUBLICATIONS

Unknown, Author, "Further Analysis of PRACH Using Unidirectional Deployment", 3GPP TSG-RAN WG4 Meeting #76, R4-154620, Ericsson, Beijing, China, Aug. 24-28, 2015, pp. 1-4.

Unknown, Author, "Link Simulation—Coverage by RRH Arrangements for HST SFN", 3GPP TSG RAN WG4 Meeting #76, R4-155132, Ericsson, Beijing, China, Aug. 24-28, 2015, pp. 1-5.

Unknown, Author, "Modified RRH Arrangement for HST SFN", 3GPP TSG RAN WG4 Meeting #76, R4-154516, Ericsson, Beijing, China, Aug. 24-28, 2015, pp. 1-13.

Unknown, Author, "TP Unidirectional RRH Arrangement", 3GPP TSG RAN WG4 Meeting #76, R4-154518, Ericsson, Beijing, China, Aug. 24-28, 2015, pp. 1-5.

Unknown, Author, "UE Performance Evaluation and Enhancement under the New Scenarios", 3GPP TSG-RAN WG4 Meeting #76, R4-154243, Huawei/HiSilicon, Beijing, China, Aug. 24-28, 2015, pp. 1-11.

Unknown, Author, "Way Forward on Unidirectional RRH Arrangement", 3GPP TSG-RAN WG4 Meeting #76, R4-155157, Ericsson/Telecom Italia, Beijing, China, Aug. 24-28, 2015, pp. 1-3.

3GPP, "3rd Generation Partnership Project; Technical Specification Group Radio Access Network; Study on performance enhancements for high speed scenario in LTE (Release 13)", 3GPP TR 36.878 V0.2.0 (Aug. 2015), Aug. 2015, 1-22.

* cited by examiner

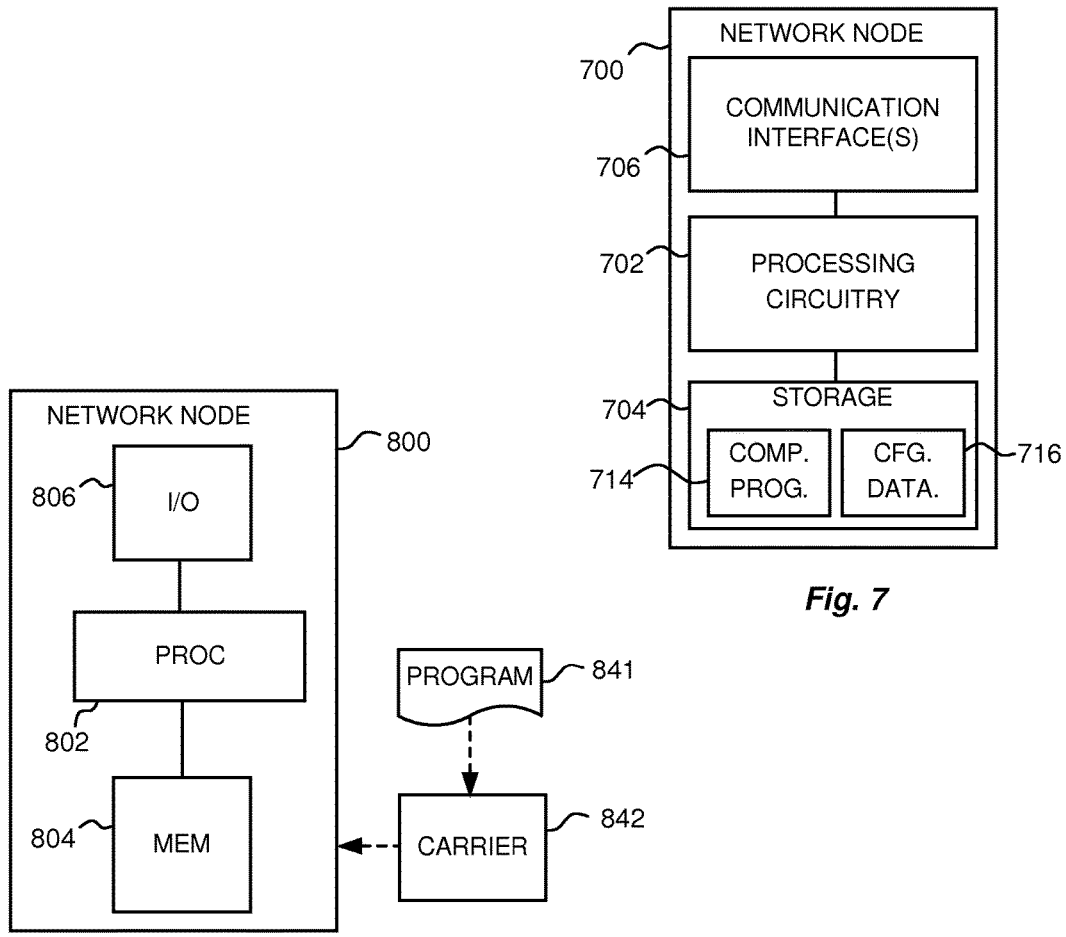
Fig. 7
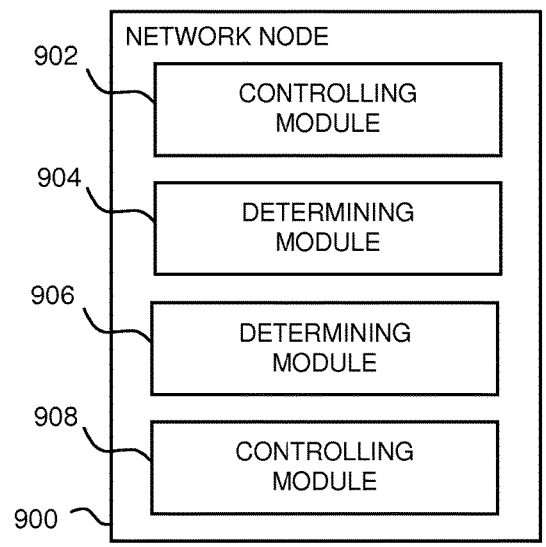
Fig. 8
Fig. 9

SCHEDULING IN HIGH SPEED SCENARIO

TECHNICAL FIELD

Embodiments herein relate to wireless communication, and more specifically to controlling antenna nodes located along a path where a wireless communication device is moving.

BACKGROUND

Wireless communication systems, i.e. systems that provide communication services to wireless communication devices such as mobile phones, smartphones (often denoted by UE that is short for user equipment) as well as machine-type communication (MTC) devices, have evolved during the last decade into systems that must utilize the radio spectrum and other system resources in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train.

To meet this demand, within the third generation partnership project (3GPP) work is being done regarding possible enhancements to radio resource management, RRM, performance in high speed train environments. The justification is that there are railways such as Japan Tohoku Shinkansen (running at 320 km/h), German ICE (330 km/h), AGV Italo (400 km/h), and Shanghai Maglev (430 km/h) at which vehicles travel at greater speed than 300 km/h and where there is demand for using mobile services.

For example, a new channel model for a particular high speed train (HST) scenario has been included in the study item technical report 3GPP RAN4 TR 36.878 V0.2.0. The scenario comprises cells consisting of multiple remote radio heads (RRHs) along the railway track, with downlink transmission (DLTX) antennas/radio lobes and uplink reception (ULRX) antennas/radio lobes, respectively, pointing towards each other.

FIG. 1 shows an example of an RRH arrangement for bidirectional RRH arrangement. In FIG. 1, an east moving UE 101 is onboard an east moving high speed train 102 on a railway track 131 and a west moving UE 103 is onboard a west moving high speed train 104 on a railway track 132. A first antenna node 110, which may be in the form of a RRH, maintains radio lobes including a transmission radio lobe 113, i.e. a DLTX lobe, and a reception radio lobe 114, i.e. an ULRX lobe. Similarly, a second antenna node 120 maintains radio lobes including a transmission radio lobe 121, i.e. a DLTX lobe, and a reception radio lobe 122, i.e. an ULRX lobe. As FIG. 1 illustrates, the transmission radio lobes 113, 121 of the respective antenna nodes 110, 120 are opposing each other and the reception radio lobes 114, 122 of the respective antenna nodes 110, 120 are opposing each other. FIG. 1 further illustrates a distance scale that shows a normalized distance measure, i.e. distance expressed as a percentage of the inter site distance (ISD), between the first antenna node 110 and the second antenna node 120. The east moving UE 101 is at a position that corresponds to 50% of the inter-site distance between the antenna nodes 110, 120.

This arrangement (in FIG. 1) is already in use by at least one large wireless communication system operator, and it has been observed that the performance is not as good as expected. The characteristics of this arrangement has been analyzed and presented in 3GPP tdoc R4-154516, and the root cause of the problems has been identified. In brief, it is related to fading caused by sending the same signal from two directions, and inter-carrier interference (ICI) due to different signs of the Doppler shifts experienced by the UE when receiving from the head or the tail direction with respect to the movement. Referring to FIG. 1, the east moving UE receives the DLTX lobe 121 from the head direction and the DLTX lobe 113 from the tail direction.

Fading and ICI significantly reduces the achievable system throughput for speeds up to 350 km/h (2.7 GHz band). Above 350 km/h the throughput for a legacy UE is less than 10% of that achievable by other RRH arrangements (see e.g. tdoc R4-154520). Since there are wireless communication systems having such bidirectional deployment already in use, there is a strong push in the standardization work to introduce UEs capable of achieving a better throughput by using advanced receiver techniques—one example can be found in 3GPP tdoc R4-154243 where a high-speed enabled UE ("HeUE") is proposed. This "high-speed enabled" UE is supposed to take the bidirectional RRH deployment into account e.g. in channel estimation to thereby improve the performance.

However, there are problems with existing solutions. The harsh reality is that even if a new UE type that is able to achieve higher throughput in bidirectional RRH arrangements is introduced (earliest from 3GPP Release13), legacy UEs (up to 3GPP Release12) will be very common for years to come.

Consequently, unless it is taken into account in the scheduling whether a UE is of legacy type or of high-speed enabled type, not much improvement will be seen on the system capacity. This is so since the legacy UEs will consume a large part of the system capacity on more robust transmission (lower coding and modulation schemes), more retransmissions, and more overhead from radio link failure (RLF)-related signaling.

SUMMARY

In view of the above, an object of the present disclosure is to overcome or at least mitigate at least some of the drawbacks related to prior art in handling wireless communication devices in HST scenarios.

This is achieved in a first aspect by a method performed by a network node. The network node is connected to a plurality of antenna nodes that are located along a path where a wireless communication device is moving. The method comprises controlling the antenna nodes to maintain a respective reception radio lobe and a respective transmission radio lobe. The lobes are substantially along the path such that the wireless communication device during movement along the path, can communicate with the network node via consecutive reception radio lobes and via consecutive transmission radio lobes. A respective reception radio lobe of consecutive antenna nodes along the path are opposing each other and a respective transmission radio lobe of consecutive antenna nodes along the path are opposing each other.

The method further comprises determining whether or not the wireless communication device is configured to operate in a high speed movement scenario. If it is determined that the wireless communication device is not configured to operate in a high speed movement scenario, then a determination is made of a position of the wireless communication device, said position being in relation to a first antenna node located behind the wireless communication device and a second antenna node located ahead of the wireless communication device. Based on the position of the wireless communication device, control is performed of scheduling of non-time critical communication at least to the wireless communication device.

In other words, in this aspect, the teachings herein disclose a method in a network node, the method comprising:

Determining whether a UE is not high-speed capable.

Determining/estimating/tracking UE position with respect to adjacent RRHs.

Adapting the scheduling of non-critical communication in such way that it only is carried out within a certain range from each respective RRH.

With regard to time-critical communication, it can be carried out when needed, but the network node then estimates, based on position between the RRHs, the needed increase in robustness for minimizing the risk for retransmissions.

Via implementation of the teachings disclosed herein, a network operator will advantageously see an increased system throughput since devices that do not handle (compensate) the special interference and fading resulting from the RRH arrangement are not scheduled in areas between RRHs where such interference is dominant.

In some embodiments, control of scheduling of communication at least to the wireless communication device may comprise determining, based on the position of the wireless communication device, a closest distance to any of the first and the second antenna node. Then, if the closest distance is greater than a first distance threshold, scheduling of the wireless communication device is avoided. The first distance threshold may, for example, be 30% of an inter site distance, ISD, between said first antenna node and said second antenna node.

The determination whether or not the wireless communication device is configured to operate in a high speed movement scenario may, in various embodiments, comprise analysing information in a performance related measurement report received from the wireless communication device. The analysis may comprise a comparison with information of performance related measurements received from other wireless communication devices. Furthermore, embodiments include those where a determination is made whether or not the wireless communication device is capable of estimating a plurality of Doppler radio frequency shifts of respective received radio frequency signals.

Embodiments include those where the determination of a position of the wireless communication device comprises a determination of a speed with which the wireless communication device is moving along the path. The position of the wireless communication device is then determined by analysing the determined speed in relation to information about a position of at least one of said antenna nodes.

For example, in some embodiments the speed determination may comprise an analysis of Doppler radio frequency characteristics associated with RF signals received from the wireless communication device.

In other embodiments, the speed determination may comprise an analysis of levels of received power of RF signals received from the wireless communication device, the analysis comprising analysis of periodicity and phase of received power in relation to information about a plurality of positions of respective antenna nodes.

In other embodiments, the speed determination may comprise an analysis of information comprised in BLER reports received from the wireless communication device, the analysis comprising analysis of periodicity and phase of BLER in relation to information about a plurality of positions of respective antenna nodes.

Embodiments include those where the determination of a position of the wireless communication device comprises calculating the position based on at least one timing advance, TA, value associated with the wireless communication device.

Embodiments include those where at least one quality of service, QoS, value that is associated with the wireless communication device is obtained, and wherein the controlling of the scheduling involves the at least one QoS value.

Some embodiments comprise obtaining a plurality of radio condition measurements associated with positions in relation to the first antenna node and the second antenna node of a plurality of wireless communication device. The obtained radio condition measurements and positions are then analysed, the analysis producing a capability measure associated with the wireless communication device, and wherein the controlling of the scheduling involves the capability measure.

In another aspect there is provided a computer program, comprising instructions which, when executed on at least one processor in a network node, cause the network node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 2A:
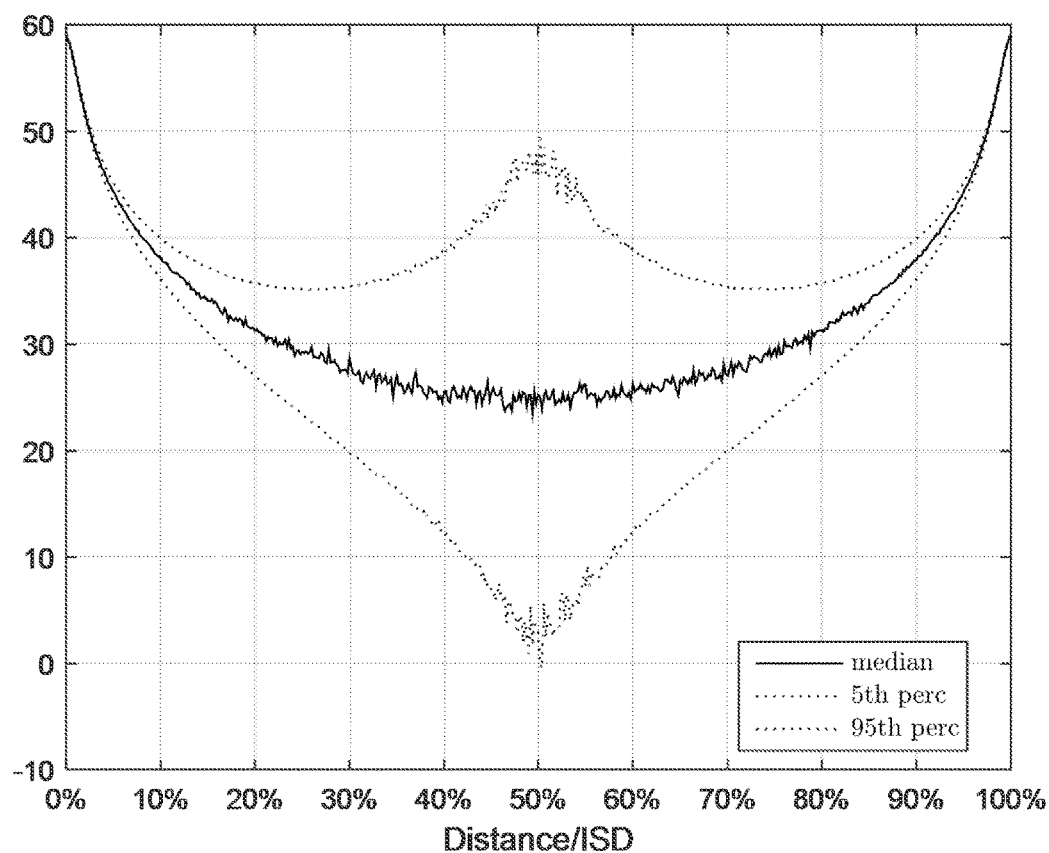
FIG. 2a is a graph that illustrates signal-to-interference ratio.

Before describing and illustrating various embodiments in detail, drawbacks related to prior art will be illustrated with graphs of inter-carrier interference and fading in HST scenarios. Moreover, in the following references will be made to antenna nodes as well as to RRHs and it is to be understood that a RRH is one type of antenna node. With reference to FIG. 2a, signal to interference ratio (SIR) resulting from inter-carrier interference for positions between two RRHs (0%: at RRH1, 100% at RRH2) is shown. That is, FIG. 2a illustrates SIR resulting from inter-carrier interference as function of UE position between RRHs for 350 km/h (minimum distance track to RRH: 10 m, Distance between RRHs: 1000 m, Carrier frequency 2.7

GHz). The solid line represents a median value for a large number of measurements/simulated measurements and the dotted lines represent the $5^{th}$ and the $95^{th}$ percentile.

Figure 2B:
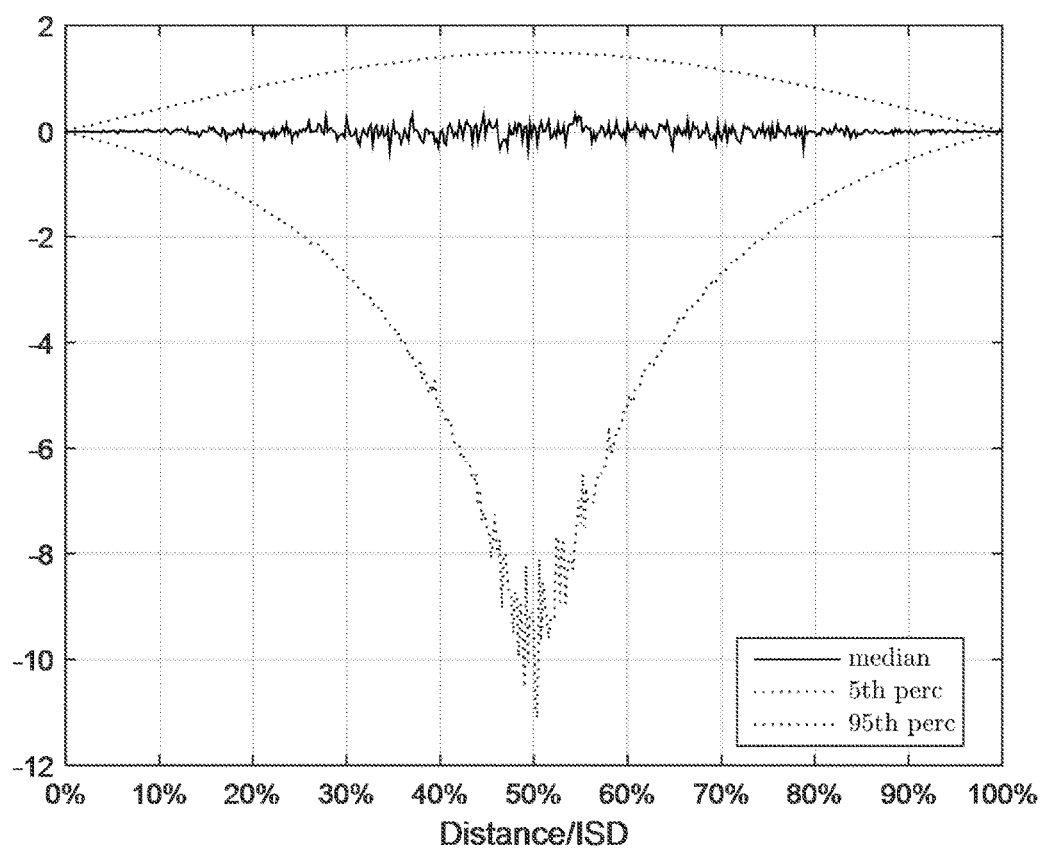
FIG. 2b is a graph that illustrates fading,
FIG. 3 schematically illustrates a network node, antenna nodes and a wireless communication device.

In FIG. 2b, average fading over downlink (DL) bandwidth as function of UE position between RRHs for 350 km/h (minimum distance track to RRH: 10, Distance between RRHs: 1000 m, Carrier frequency 2.7 GHz). The solid line represents a median value for a large number of measurements/simulated measurements and the dotted lines represent the $5^{th}$ and the $95^{th}$ percentile.

Clearly, FIGS. 2a and 2b illustrate that a wireless communication device located in a distance interval around the 50% distance/ISD will be subject to more or less severe reduction in SIR and fading when moving at a speed of at least 350 km/h.

Descriptions of various embodiments will now follow, where drawbacks as exemplified above are at least mitigated.

In one or more embodiments, a network node is configured to deduce whether a UE is high-speed enabled, e.g., such as from capability reporting or from knowing or otherwise determining which release of the standard the UE supports. It may also be defined as which bands and/or band combinations the UE supports. In cases where the applicable standards do not provide for an explicit or implicit indication of high-speed capability, the network node in at least some embodiments is configured to deduce whether or not the UE has high-speed capability from the downlink performance with respect to reported channel quality (CQI), achieved BLER, etc. In other words, a high-speed enabled UE will experience and report better radio conditions than a legacy UE, at least under some operating conditions, and the high-speed capability may be inferred based on observing such performance differentials.

The network node may determine the UE's position relative to one or more Remote Radio Heads (RRHs) by, for example, analyzing Doppler shift on received transmissions from the UE, and can, for example, reliably determine when a UE is passing an RRH based on detecting that the Doppler shift changes sign. It may further determine the speed of the UE by the amount of Doppler shift, and/or from detecting the time it takes the UE to pass between two RRHs at known geographical or relative positions. It may also use the fact that UEs onboard a train are travelling at the same speed, and hence substitute this UE's speed with a measured speed of another UE. It may additionally study DL block error history and identify periodicity and phase with respect to the known locations of the RRHs, and thereby determine when a UE will pass the next RRH and where between the following RRHs it will be at a certain point in time. Yet another option is to study fluctuations in received signal power on ULRX. In deployments with large distance between RRHs it may further take the timing advance (TA) into account when determining position between the RRHs.

Such, and other, embodiments will now be described and illustrated with reference to FIG. 3 and FIG. 4.

Figure 3:
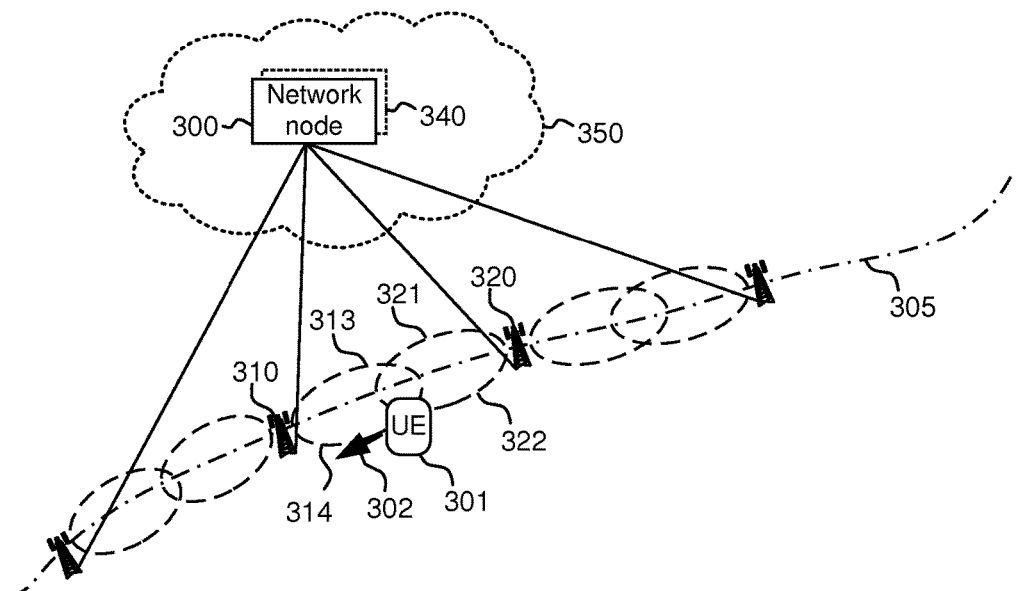

In FIG. 3, a network node 300 is connected to a plurality of antenna nodes 310, 320 that are located along a path 305 where a wireless communication device 301 is moving, the movement illustrated by a velocity vector 302. The antenna nodes 310, 320 are controlled to maintain a respective reception radio lobe 313, 321 and a respective transmission radio lobe 314, 322. The lobes 313, 321, 314, 322 are substantially along the path 305 such that the wireless communication device 301 during movement along the path 305, can communicate with the network node 300 via consecutive reception radio lobes 314, 322 and via consecutive transmission radio lobes 313, 321. The reception radio lobes 314, 322 of consecutive antenna nodes 310, 320 along the path 305 are opposing each other and the transmission radio lobes 313, 321 of consecutive antenna nodes 310, 320 along the path 305 are opposing each other.

As indicated in FIG. 3, it is to be noted that the network node 300 may be considered as a single entity as well as a combination of a plurality of entities 340. For example, the network node 300 may be distributed, in terms of functionality as well as in terms of physical hardware, over one or more processing units that are residing in a logical entity 350 that may be defined as a "cloud".

As will be exemplified below, the network node 300 may also be in the form of a node in a 3GPP long term evolution (LTE) system.

Figure 4:
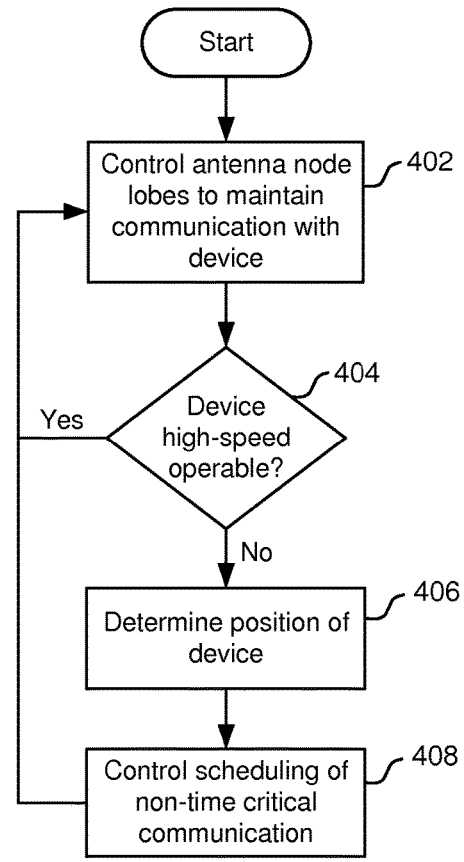
FIG. 4 is a flowchart of a method,
FIG. 5 schematically illustrates a wireless communication system,
FIG. 6 schematically illustrates functional blocks in a network node and in antenna nodes,
FIG. 7 schematically illustrates a network node,
FIG. 8 schematically illustrates a network node, and
FIG. 9 schematically illustrates a network node.

Turning now to FIG. 4, and with continued reference to FIG. 3, a method will be described with reference to a number of actions that are performed by a network node, such as the network node 300.

Action 402

The antenna nodes 310, 320 are controlled to maintain a respective reception radio lobe 313, 321 and a respective transmission radio lobe 314, 322. The lobes 313, 321, 314, 322 are substantially along the path 305 such that the wireless communication device 301 during movement along the path 305, can communicate with the network node 300 via consecutive reception radio lobes 314, 322 and via consecutive transmission radio lobes 313, 321. The reception radio lobes 314, 322 of consecutive antenna nodes 310, 320 along the path 305 are opposing each other and the transmission radio lobes 313, 321 of consecutive antenna nodes 310, 320 along the path 305 are opposing each other. In the following, antenna node 320 will be denoted "first antenna node" and antenna node 310 will be denoted "second antenna node".

Action 404

A determination is made whether or not the wireless communication device 301 is configured to operate in a high speed movement scenario.

For example, the determination in action 404 whether or not the wireless communication device is configured to operate in a high speed movement scenario may comprise analysing information in a performance related measurement report received from the wireless communication device. This analysis may comprise a comparison with information of performance related measurements received from other wireless communication devices.

Other embodiments include those where the determination in action 404 whether or not the wireless communication device is configured to operate in a high speed movement scenario may comprise determining whether or not the wireless communication device is capable of estimating a plurality of Doppler radio frequency shifts of respective received radio frequency signals.

If it is determined that the wireless communication device 301 is configured to operate in a high speed movement scenario, the method may return to action 402.

Action 406

If, in action 404, it is determined that the wireless communication device is not configured to operate in a high speed movement scenario, then a determination is made of a position of the wireless communication device 301, said position being in relation to a first antenna node 320 located behind the wireless communication device 301 and a second antenna node 310 located ahead of the wireless communication device 301.

For example, the determination in action 406 of a position of the wireless communication device may comprise determining a speed with which the wireless communication device is moving along the path. This speed determination may then be followed by a determination of the position of the wireless communication device by analysing the determined speed in relation to information about a position of at least one of said antenna nodes. In other embodiments, the determination in action 406 of a position of the wireless communication device may comprise calculating the position based on at least one timing advance, TA, value associated with the wireless communication device in embodiments that operate according to LTE.

The determination of the speed of the wireless communication device may, in various embodiments, comprise use of detected radio frequency, RF, signals transmitted by the wireless communication device. These received RF signals may, in various embodiments, be analysed. In some embodiments, the analysis comprises an analysis of Doppler radio frequency characteristics associated with received RF signals and in some embodiments, the analysis comprises an analysis levels of received power of RF signals, the analysis comprising an analysis of periodicity and phase of received power in relation to information about a plurality of positions of respective antenna nodes.

The determination of the speed of the wireless communication device may, in various other embodiments, comprise use of a plurality of received block error rate, BLER, reports from the wireless communication device. An analysis may be performed of information comprised in such BLER reports, the analysis comprising analysis of periodicity and phase of BLER in relation to information about a plurality of positions of respective antenna nodes.

Action 408

Also, if it is determined in action 404 that the wireless communication device 301 is not configured to operate in a high speed movement scenario, then based on the position of the wireless communication device 301, control is performed of scheduling of non-time critical communication at least to the wireless communication device 301, whereupon the method may return to action 402.

Examples of time-critical communication include voice over internet protocol (VoIP) and voice over long term evolution (VoLTE). Examples of non-time-critical communication include web browsing and file transfer. How time-critical a communication service is, is generally given by QoS of the associated evolved packet system (EPS) bearer (in embodiments that operate according to LTE). It is the mobility management entity (MME) (in embodiments that operate according to LTE) that has this information, and in case it is not shared already with e.g. the evolved NodeB (eNodeB) (in embodiments that operate according to LTE), in certain embodiments such sharing is introduced so the eNodeB knows which data streams to which UEs are time critical, and which are not. Some embodiments comprise obtaining at least one QoS value that is associated with the wireless communication device. In these embodiments, the controlling of the scheduling in action 408 may involve this at least one QoS value.

In some embodiments, control of scheduling in action 408 of communication at least to the wireless communication device 301 may comprise determining, based on the position of the wireless communication device 301 that was determined in action 406, a closest distance to any of the first and the second antenna nodes 320, 310. Then, if the closest distance is greater than a first distance threshold, scheduling of the wireless communication device 301 is avoided. The first distance threshold may, for example, be 30% of an inter site distance, ISD, between said first antenna node 320 and said second antenna node 310.

That is, a network node working according to embodiments described herein may for instance avoid scheduling an incapable UE when it is further away than ⅓ inter-site distance from the closest RRH (i.e. in the range 0-30% or 70-100%) as such strategy secures that the SIR conditions with respect to ICI are higher than 10 dB in 95% of the cases, thereby allowing at least midrange modulation and coding scheme (MCS) to be used.

The same network node may schedule high-speed enabled UEs whenever needed, but may be unnecessarily impeded, particularly in areas where incapable UEs cannot operate without spending a large amount of the system capacity on robustness and retransmissions.

In some embodiments the network node may build up information (e.g. acquire and accumulate performance statistics) on how UEs with certain incapabilities and/or capabilities experience the radio conditions at different positions between the RRHs, and when sufficient information (e.g. in the form of statistics) has been collected from multiple UEs, the network node may adapt its scheduling, based on UE capability, to minimize the need for overly robust encoding. Such embodiments may comprise obtaining a plurality of radio condition measurements associated with positions in relation to the first antenna node and the second antenna node of a plurality of wireless communication device. The obtained radio condition measurements and positions are then analysed, the analysis producing a capability measure associated with the wireless communication device. The controlling of the scheduling in action 408 may then involve the capability measure.

Figure 5:
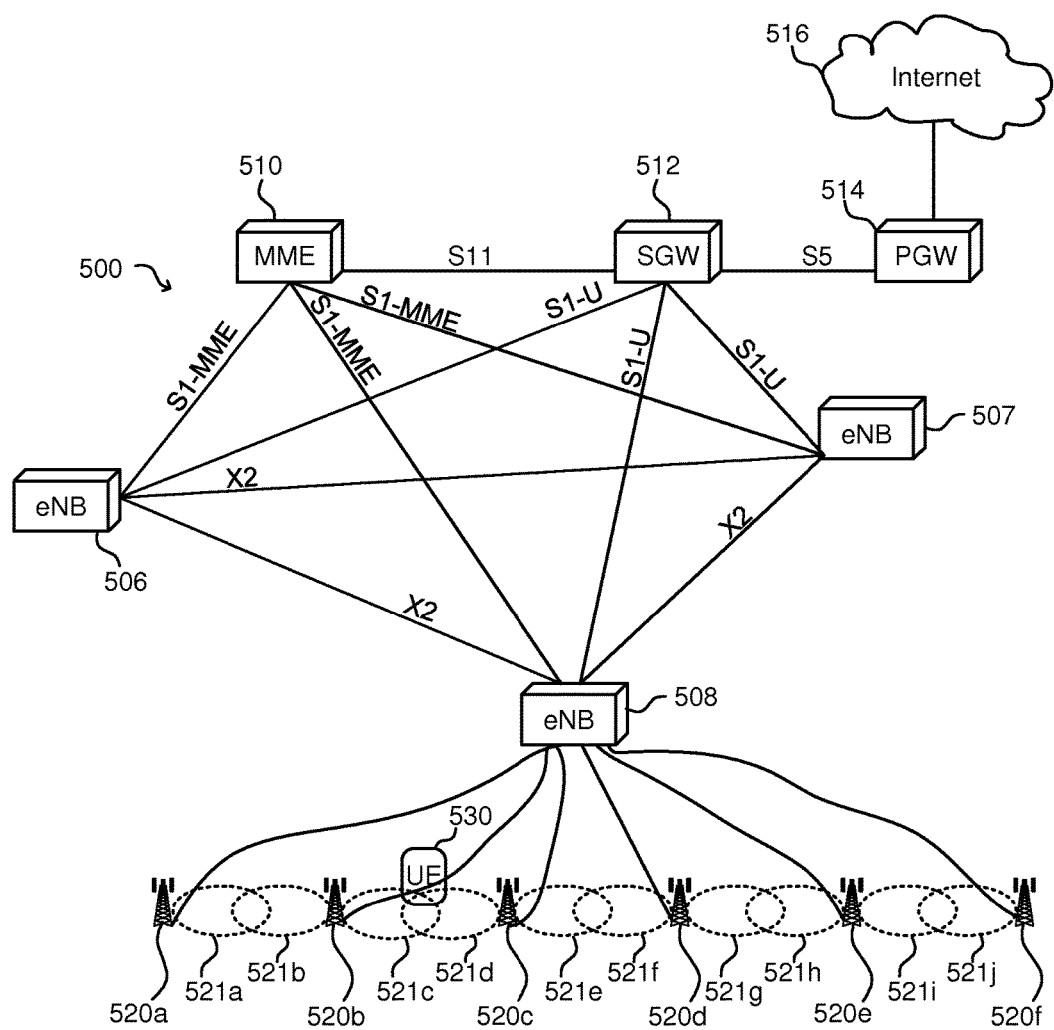

Turning now to FIG. 5, which illustrates parts of a 3GPP long term evolution, LTE, wireless network 500 and a compatible core network. Base stations (enhanced NodeB, eNodeB or eNB) 506, 507, 508 are communicating with each other over an X2 interface. The base stations 506, 507 and 508 are connected to a mobility management entity, MME, 510, which keeps information about UEs (i.e. UE contexts) regarding capabilities etc., which the MME 510 shares, e.g., with base stations connected to it. The MME 510 is also managing handover of a UE from one MME to another when a UE leaves the pool of base stations managed by a source MME, or when the X2 connection is missing between the source and target base stations.

The base stations 506, 507 and 508 are further connected to a serving gateway, SGW, 512, which is handing the user data plane transport to and from the base station to which a UE is connected, and to one or more packet data network gateways, PGW, 514, which connect UEs to the internet 516. The MME in whose pool of base stations a UE resides configures which base station the SGW shall connect to for transport of the UE user plane data.

In FIG. 5, the base station 508 is a network node as defined above and the base station/network node 508 is connected to a number of antenna nodes 520a-f. The base station/network node 508 controls the antenna nodes 520a-f as discussed herein and thereby maintaining respective radio lobes 521a-j. A UE 530 is illustrated, which may correspond to any UE described herein.

Control of scheduling, as exemplified above, may be handled by a single network node such as an eNodeB (as indicated in FIG. 5) using antenna nodes in the form of remote radio heads, RRH, or remote radio units, RRU, for the individual radio lobes 521a-f. Control of scheduling may in other embodiments be handled by a group of eNodeBs with or without RRHs or RRUs operating in a cooperative manner, or such group of eNodeBs under coordination of another network node, either a new entity or an existing one with extended functionality, e.g. an MME.

Figure 1:
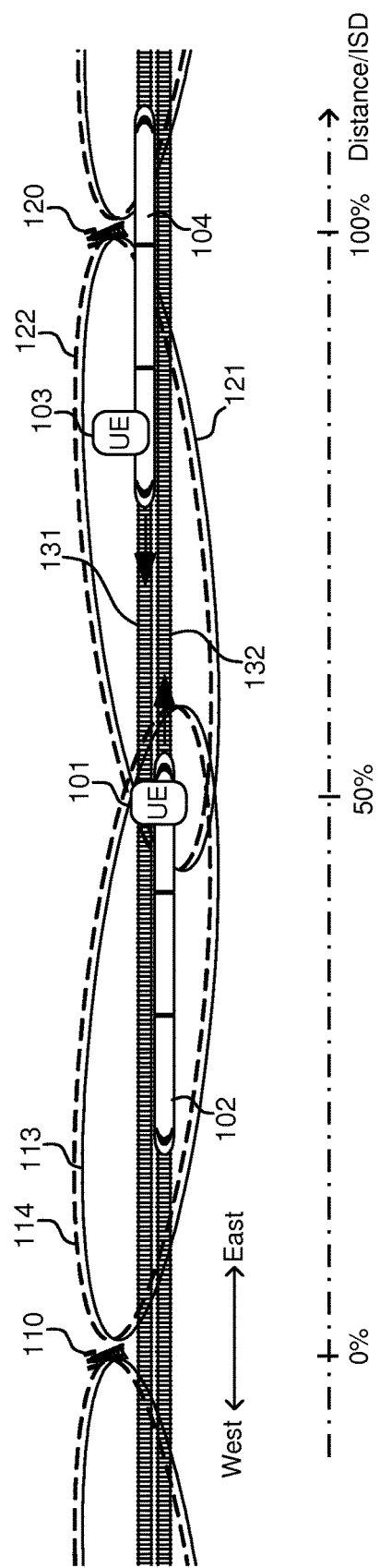
FIG. 1 schematically illustrates a HST scenario.
Figure 6:
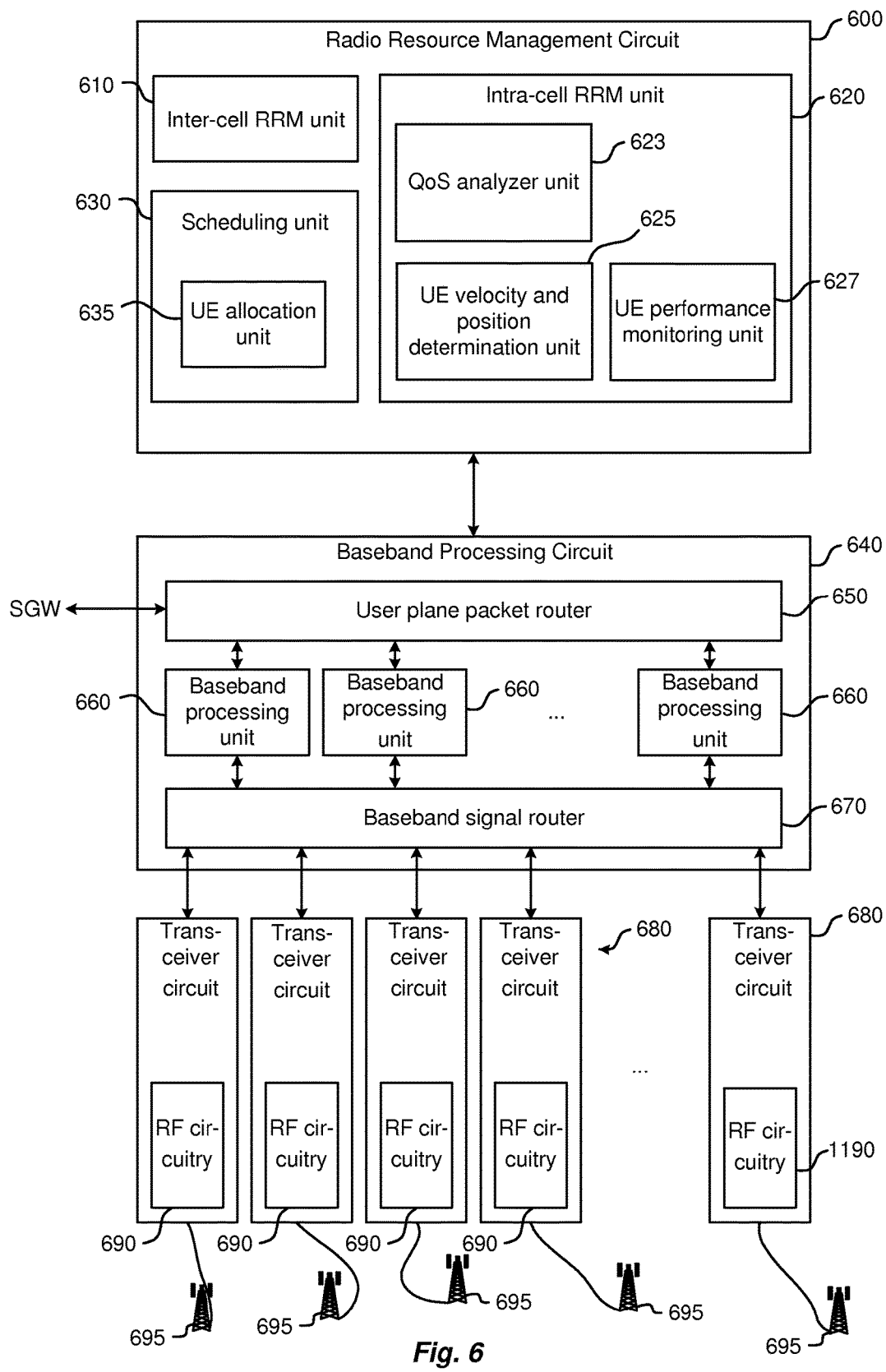

Turning now to FIG. 6, an example of arrangements, in the form of functional blocks, in a network node will be described in some more detail. The arrangements in FIG. 6 may be comprised in any of the network nodes discussed above in connection with FIGS. 1, 3 and 5.

A radio resource management (RRM) circuit 600 comprises an Inter-cell RRM unit 610 for handling information and processing in relation to mobility of wireless communication devices between cells in a wireless communication network, e.g. a single frequency network (SFN), where cells may have one and the same or different physical cell identities.

An intra-cell RRM unit 620 is comprised in the RRM circuit 600, the intra-cell RRM unit 620 being capable of handling information and processing in relation to mobility within a cell (e.g. part of a SFN cell) managed by this network node, e.g. eNodeB.

A scheduling unit 630 is configured to, in addition to scheduling operations that are outside of the present disclosure, handle scheduling of communication as described herein.

The Intra-RRM unit further comprises a QoS analyzer 623 which is configured to determine which traffic is time critical and which is not. A velocity and position determination unit 625 is configured to determine position and velocity of wireless communication devices based on various kinds of measurements (e.g. as discussed herein), and a UE performance monitoring unit 627 which monitors performance of wireless communication devices and collects statistics (e.g. BLER) on the performance based on reported capabilities or release, location and speed of the wireless communication devices. The acquired statistics can be used for determining where, with respect to position and speed of a wireless communication device to allocate a particular kind of wireless communication device.

A baseband processing unit 640 comprises one or more baseband processing units 660 connected to a SGW via a user plane packet router 650, and connected to transceiver circuits 680 comprising RF circuitry 690 via a baseband signal router 670. Connection with antenna nodes 695 is realized via the transceiver circuits 680.

Turning now to FIG. 7, in an example embodiment, it is contemplated to implement a method in a network node 700, where the method comprises:
  Determining whether a UE is not high-speed capable e.g., according to any of the explicit or implicit determinations disclosed herein.
  Determining/estimating/tracking UE position with respect to adjacent RRHs e.g., according to any of the determination mechanisms disclosed herein.
  Adapting the scheduling of non-critical communication in such way that it only is carried out within a certain range from each respective RRH.

Time-critical communication can be carried out when needed, but the network node 700 then estimates, based on position between the RRHs, the needed increase in robustness for minimizing the risk for retransmissions.

The example network node 700 appears in FIG. 7 and shall be understood as illustrating functional and/or physical processing circuitry in one or more embodiments, along with associated supporting circuitry (such as storage and one or more communication interfaces).

The example network node 700 comprises fixed circuitry, programmed circuitry, or any mix thereof. In an example embodiment, the communication interface(s) comprises one or more communication interfaces 706 configured for sending signals to and receiving signals from one or more other nodes in the network, where such nodes may be mobile nodes, e.g., with communications involving wireless signaling, and/or other nodes in the involved wireless communication network.

In this regard, the communication interface(s) in an example embodiment comprise one or more physical layer circuits for interfacing with the physical communication medium/media, and associated protocol processing circuitry.

Further in this example case, processing circuitry 702 is operatively associated with the communication interface(s) 706, e.g., configured to send and/or receive signals via the communication interface(s) 706. Further, the processing circuitry 702 is configured to carry out the network node operations disclosed herein, e.g., determining whether a UE is not high-speed capable, according to any of the explicit or implicit determinations disclosed herein, and determining UE position with respect to adjacent RRHs, e.g., according to any of the determination mechanisms disclosed herein. Determining UE position comprises, for example estimating or tracking the UE position.

In at least one embodiment, the processing circuitry 702 comprises one or more microprocessors, microcontrollers, Digital Signal Processors, Field Programmable Gate Arrays, Application Specific Integrated Circuits, or other digital processing circuitry. In at least one such embodiment, the processing circuitry 702 is configured (i.e., specially adapted) to carry out the operations disclosed herein, based on the execution of computer program instructions comprising a computer program stored in storage 704 that is included in or operatively associated with the processing circuitry. The storage 704 provides non-transitory storage of the computer program 714, and possibly for one or more items of related configuration data 716.

Here, "non-transitory" does not necessarily mean permanent or unchanging storage, but does imply storage of at least some persistence, e.g., storage for subsequent retrieval. As such, the storage 704 may comprise volatile storage, non-volatile storage, or any mix of volatile and non-volatile storage. Non-limiting non-volatile storage examples include FLASH, EEPROM, or Solid State Disk. Non-limiting volatile storage examples include DRAM or SRAM. The storage 704 in at least one embodiment therefore provides both long-term storage of computer program instructions and working memory for the execution of such instructions and/or for maintaining working data.

Turning now to FIGS. 8 and 9, further embodiments of a network node as discussed above will be described in some detail.

FIG. 8 schematically illustrates a network node 800. The network node 800 is configured to be connected to a plurality of antenna nodes that are located along a path where a wireless communication device is moving. The network node 800 comprises input/output circuitry 806, a processor 802 and a memory 804. The memory 804 contains instructions executable by the processor 802 whereby the network node 800 is operative to:
  control the antenna nodes to maintain a respective reception radio lobe and a respective transmission radio lobe substantially along the path such that the wireless communication device during movement along the path, can communicate with the network node via consecutive reception radio lobes and via consecutive transmission radio lobes and such that a respective reception radio lobe of consecutive antenna nodes along the path are opposing each other and such that a respective transmission radio lobe of consecutive antenna nodes along the path are opposing each other, determine whether or not the wireless communication device is configured to operate in a high speed movement scenario, if it is determined that the wireless communication device is not configured to operate in a high speed movement scenario, then:

determine a position of the wireless communication device, said position being in relation to a first antenna node located behind the wireless communication device and a second antenna node located ahead of the wireless communication device, and control, based on the position of the wireless communication device, scheduling of non-time critical communication at least to the wireless communication device.

The instructions that are executable by the processor 802 may be software in the form of a computer program 841. The computer program 841 may be contained in or by a carrier 842, which may provide the computer program 841 to the memory 804 and processor 802. The carrier 842 may be in any suitable form including an electronic signal, an optical signal, a radio signal or a computer readable storage medium.

In some embodiments, the network node 800 is operative such that the control of scheduling of communication at least to the wireless communication device comprises:

determining, based on the position of the wireless communication device, a closest distance to any of the first and the second antenna node, if the closest distance is greater than a first distance threshold, avoid scheduling the wireless communication device.

In some embodiments, the network node 800 is operative such that the first distance threshold is 30% of an inter site distance, ISD, between the first antenna node and the second antenna node.

In some embodiments, the network node 800 is operative such that the determination whether or not the wireless communication device is configured to operate in a high speed movement scenario comprises:

analysing information in a performance related measurement report received from the wireless communication device, said analysis comprising a comparison with information of performance related measurements received from other wireless communication devices.

In some embodiments, the network node 800 is operative such that the determination whether or not the wireless communication device is configured to operate in a high speed movement scenario comprises:

determining whether or not the wireless communication device is capable of estimating a plurality of Doppler radio frequency shifts of respective received radio frequency signals.

In some embodiments, the network node 800 is operative such that the determination of a position of the wireless communication device comprises:

determining a speed with which the wireless communication device is moving along the path, determining the position of the wireless communication device by analysing the determined speed in relation to information about a position of at least one of said antenna nodes.

In some embodiments, the network node 800 is operative such that the determination of the speed of the wireless communication device comprises:

analysing Doppler radio frequency characteristics associated with RF signals received from the wireless communication device.

In some embodiments, the network node 800 is operative such that the determination of the speed of the wireless communication device comprises:

analysing levels of received power of RF signals received from the wireless communication device, said analysis comprising analysis of periodicity and phase of received power in relation to information about a plurality of positions of respective antenna nodes.

In some embodiments, the network node 800 is operative such that the determination of the speed of the wireless communication device comprises:

analysing information comprised in BLER reports received from the wireless communication device, said analysis comprising analysis of periodicity and phase of BLER in relation to information about a plurality of positions of respective antenna nodes.

In some embodiments, the network node 800 is operative such that the determination of a position of the wireless communication device comprises:

calculating the position based on at least one timing advance, TA, value associated with the wireless communication device.

In some embodiments, the network node 800 is operative to:

obtain at least one quality of service, QoS, value that is associated with the wireless communication device, and wherein the controlling of the scheduling involves the at least one QoS value.

In some embodiments, the network node 800 is operative to:

obtain a plurality of radio condition measurements associated with positions in relation to the first antenna node and the second antenna node of a plurality of wireless communication device, analyse the obtained radio condition measurements and positions, said analysis producing a capability measure associated with the wireless communication device, and wherein the controlling of the scheduling involves the capability measure.

FIG. 9, illustrates schematically a network node 900 that comprises:

a controlling module 902 configured to control the antenna nodes to maintain a respective reception radio lobe and a respective transmission radio lobe substantially along the path such that the wireless communication device during movement along the path, can communicate with the network node via consecutive reception radio lobes and via consecutive transmission radio lobes and such that a respective reception radio lobe of consecutive antenna nodes along the path are opposing each other and such that a respective transmission radio lobe of consecutive antenna nodes along the path are opposing each other, a determining module 904 configured to determine whether or not the wireless communication device is configured to operate in a high speed movement scenario, if it is determined that the wireless communication device is not configured to operate in a high speed movement scenario, then:

determine, in a determining module 906, a position of the wireless communication device, said position being in relation to a first antenna node located behind the wireless communication device and a second antenna node located ahead of the wireless communication device, and control, in a controlling module 908, based on the position of the wireless communication device, scheduling of non-time critical communication at least to the wireless communication device.

The network node 900 may comprise further modules that are configured to perform in a similar manner as, e.g., the node 1800 described above in connection with FIG. 8.

In case it is not clear from the context in which they appear, below follows a summary of abbreviations of some of the technical terms used in the description above.

| Abbreviation | Explanation |
|---|---|
| BBPU | Baseband processing unit |
| C-RNTI | Cell radio network temporary identifier |
| DL | Downlink |
| DRX | Discontinuous reception |
| eNB | evolved NodeB |
| FDD | Frequency division duplex |
| FFT | Fast Fourier transform |
| HST | High speed train |
| PRACH | Physical random access channel |
| PUCCH | Physical uplink control channel |
| PUSCH | Physical uplink shared channel |
| RA | Random access |
| RAU | Remote antenna unit |
| RLF | Radio link failure |
| RRH | Remote radio head |
| Rx | Receive(r) |
| SFN | Single Frequency Network |
| SG | Scheduling grant |
| SR | Scheduling request |
| TA | Timing advance |
| TDD | Time division duplex |
| TRx | Transceiver |
| Tx | Transmit(ter) |
| UE | User equipment |
| UL | Uplink |

The invention claimed is:

1. A method performed by a network node, where the network node is connected to a plurality of antenna nodes that are located along a path where a wireless communication device is moving, the method comprising:
controlling a consecutive pair of antenna nodes, proximate to the wireless communication device along the path, to provide a corresponding pair of reception radio lobes and a corresponding pair of transmission radio lobes that enable the pair of antenna nodes to communicate concurrently with the wireless communication device, wherein the radio lobes of the corresponding pairs are oriented in substantially opposite directions with respect to the path;
determining whether or not the wireless communication device is configured to operate in a high speed movement scenario,
responsive to determining that the wireless communication device is not configured to operate in a high speed movement scenario:
determining a position of the wireless communication device in relation to each antenna node of the consecutive pair, and
controlling, based on the position of the wireless communication device, scheduling of non-time critical communication at least to the wireless communication device.

2. The method of claim 1, wherein controlling said scheduling comprises:
determining, based on the position of the wireless communication device, a closest distance to either of the first and second antenna nodes, and
avoiding scheduling the wireless communication device responsive to determining that the closest distance is greater than a first distance threshold.

3. The method of claim 2, wherein the first distance threshold is 30% of an inter site distance (ISD) between the first and second antenna nodes.

4. The method of claim 1, wherein determining whether or not the wireless communication device is configured to operate in a high speed movement scenario comprises:
analysing information in a performance-related measurement report received from the wireless communication device, the analysis comprising a comparison with information about performance-related measurements received from other wireless communication devices.

5. The method of claim 1, wherein determining whether or not the wireless communication device is configured to operate in a high speed movement scenario comprises:
determining whether or not the wireless communication device is capable of estimating a plurality of Doppler radio frequency shifts of respective received radio frequency signals.

6. The method of claim 1, wherein determining the position of the wireless communication device comprises:
determining a speed with which the wireless communication device is moving along the path, and
determining the position of the wireless communication device by analysing the determined speed in relation to position information for at least one of the antenna nodes.

7. The method of claim 6, wherein determining the speed of the wireless communication device comprises:
analysing Doppler radio frequency characteristics associated with radio frequency (RF) signals received from the wireless communication device.

8. The method of claim 6, wherein determining the speed of the wireless communication device comprises:
analysing levels of received power of radio frequency (RF) signals received from the wireless communication device, the analysis comprising analysis of periodicity and phase of received power in relation to position information for a plurality of respective ones of the antenna nodes.

9. The method of claim 6, wherein determining the speed of the wireless communication device comprises:
analysing information comprised in BLock Error Rate (BLER) reports received from the wireless communication device, the analysis comprising analysis of periodicity and phase of BLER in relation to position information for a plurality of respective ones of the antenna nodes.

10. The method of claim 1 wherein determining the position of the wireless communication device comprises:
calculating the position based on at least one timing advance (TA) value associated with the wireless communication device.

11. The method of claim 1, comprising:
obtaining at least one Quality of Service (QoS) value that is associated with the wireless communication device, and wherein controlling the scheduling involves the at least one QoS value.

12. The method of claim 1, comprising:
obtaining a plurality of radio condition measurements associated with positions of a plurality of wireless communication devices in relation to the first and second antenna nodes, and
analysing the obtained radio condition measurements and positions, the analysis producing a capability measure associated with the wireless communication device, and wherein controlling the scheduling involves the capability measure.

13. A network node configured to be connected to a plurality of antenna nodes that are located along a path where a wireless communication device is moving, the network node comprising:
input/output circuitry,
a processor, and
a memory storing instructions executable by said processor that configure the network node to:
control a consecutive pair of antenna nodes, proximate to the wireless communication device along the path, to provide a corresponding pair of reception radio lobes and a corresponding pair of transmission radio lobes that enable the pair of antenna nodes to communicate concurrently with the wireless communication device, wherein the radio lobes of the corresponding pairs are oriented in substantially opposite directions with respect to the path;
determine whether or not the wireless communication device is configured to operate in a high speed movement scenario,
responsive to determining that that the wireless communication device is not configured to operate in a high speed movement scenario:
determine a position of the wireless communication device in relation to each antenna node of the consecutive pair, and
control, based on the position of the wireless communication device, scheduling of non-time critical communication at least to the wireless communication device.

14. The network node of claim 13, wherein, to control the scheduling, the network node is operative to:
determine, based on the position of the wireless communication device, a closest distance to either of the first and second antenna nodes, and
avoid scheduling the wireless communication device responsive to determining that the closest distance is greater than a first distance threshold.

15. The network node of claim 14, wherein the first distance threshold is 30% of an inter site distance (ISD) between the first and second antenna nodes.

16. The network node of claim 13, wherein, to determine whether or not the wireless communication device is configured to operate in a high speed movement scenario, the network node is operative to:
analyse information in a performance related measurement report received from the wireless communication device, said analysis comprising a comparison with information about performance-related measurements received from other wireless communication devices.

17. The network node of claim 13, wherein, to determine whether or not the wireless communication device is configured to operate in a high speed movement scenario, the network node is operative to:
determine whether or not the wireless communication device is capable of estimating a plurality of Doppler radio frequency shifts of respective received radio frequency signals.

18. The network node of claim 13, wherein, to determine the position of the wireless communication, the network node is operative to:
determine a speed with which the wireless communication device is moving along the path, and
determine the position of the wireless communication device by analysing the determined speed in relation to position information for at least one of the antenna nodes.

19. The network node of claim 18, wherein, to determine the speed of the wireless communication device, the network node is operative to:
analyse Doppler radio frequency characteristics associated with radio frequency (RF) signals received from the wireless communication device.

20. The network node of claim 18, wherein, to determine the speed of the wireless communication device, the network node is operative to:
analyse levels of received power of radio frequency (RF) signals received from the wireless communication device, the analysis comprising analysis of periodicity and phase of received power in relation to position information for a plurality of respective ones of the antenna nodes.

21. The network node of claim 18, wherein, to determine the speed of the wireless communication device, the network node is operative to:
analyse information comprised in BLock Error Reports (BLER) reports received from the wireless communication device, the analysis comprising analysis of periodicity and phase of BLER in relation to position information for a plurality of respective ones of the antenna nodes.

22. The network node of claim 13, wherein, to determine the position of the wireless communication device, the network node is operative to:
calculate the position based on at least one timing advance (TA) value associated with the wireless communication device.

23. The network node of claim 13, wherein the network node is operative to:
obtain at least one Quality of Service (QoS) value that is associated with the wireless communication device, and to control the scheduling further based on the at least one QoS value.

24. The network node of claim 13, wherein the network node is operative to:
obtain a plurality of radio condition measurements associated with positions of a plurality of wireless communication devices in relation to the first and second antenna nodes, and
analyze the obtained radio condition measurements and positions, said analysis producing a capability measure associated with the wireless communication device, and control the scheduling based on the capability measure.

25. A non-transitory computer-readable medium storing program instructions that, when executed on at least one processor in a network node that is connected to a plurality of antenna nodes that are located along a path where a wireless communication device is moving, configured the network node to:
- control a consecutive pair of antenna nodes, proximate to the wireless communication device along the path, to provide a corresponding pair of reception radio lobes and a corresponding pair of transmission radio lobes that enable the pair of antenna nodes to communicate concurrently with the wireless communication device, wherein the radio lobes of the corresponding pairs are oriented in substantially opposite directions with respect to the path;
- determine whether or not the wireless communication device is configured to operate in a high speed movement scenario,
- responsive to determining that the wireless communication device is not configured to operate in a high speed movement scenario:
  - determine a position of the wireless communication device in relation to each antenna node of the consecutive pair, and
  - control, based on the position of the wireless communication device, scheduling of non-time critical communication at least to the wireless communication device.

* * * * *